United States Patent [19]

McKeon et al.

[11] Patent Number: 5,371,335
[45] Date of Patent: Dec. 6, 1994

[54] SPARK PLUG ELECTRODE WELDING SYSTEM

[75] Inventors: John F. McKeon, Swartz Creek; Paul A. Wheeler, Linden, both of Mich.

[73] Assignee: General Motors Coporation, Detroit, Mich.

[21] Appl. No.: 106,748

[22] Filed: Aug. 16, 1993

Related U.S. Application Data

[63] Continuation-in-part of Ser. No. 782,239, Oct. 23, 1991, Pat. No. 5,250,778.

[51] Int. Cl.$^5$ ............................................. B23K 11/00
[52] U.S. Cl. .................................. 219/117.1; 219/56; 445/7
[58] Field of Search ................ 219/56, 56.1, 56.22, 219/117.1; 445/7

[56] References Cited

U.S. PATENT DOCUMENTS

| | | | |
|---|---|---|---|
| 3,348,016 | 10/1967 | Fitzgerald et al. | 210/56.1 |
| 4,211,913 | 7/1980 | Camardella | 219/56.1 |
| 4,699,600 | 10/1987 | Kondo | 445/7 |
| 4,700,103 | 10/1987 | Yamaguchi et al. | 313/141 |
| 4,810,220 | 3/1989 | Moore | 445/7 |
| 4,904,216 | 2/1990 | Kagawa et al. | 445/7 |

FOREIGN PATENT DOCUMENTS 2234920  2/1991  United Kingdom ............ 445/7

OTHER PUBLICATIONS

"Schlatter C-System", Advertising Brochure of H. A. Schlatter Ltd. of Zurich Switzerland, Sep. 1982.

Primary Examiner—Clifford C. Shaw
Attorney, Agent, or Firm—Anthony L. Simon

[57] ABSTRACT

A method of welding a noble metal tip to a spark plug center electrode comprises the steps of placing a plurality of spark plug center electrodes into a plurality of carriers so that each carrier carries one spark plug center electrode, one by one moving each carrier into a weld station, lifting the one spark plug center electrode carried in the carrier located in the weld station out of the carrier into a weld position, clamping the one spark plug center into the weld position with a single clamp located in the weld station, and welding the noble metal tip to the one spark plug center electrode, wherein the single clamp eliminates clamp-to-clamp process variations.

6 Claims, 6 Drawing Sheets

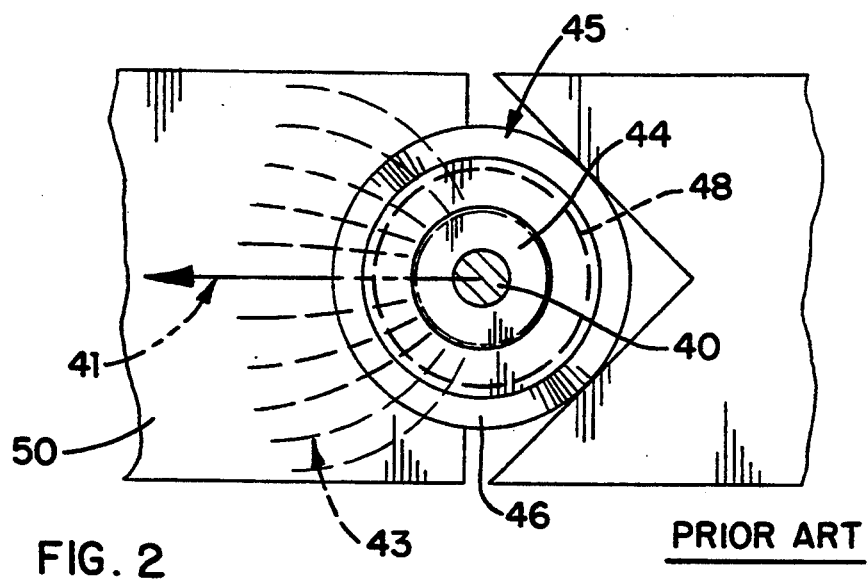
FIG. 2   PRIOR ART
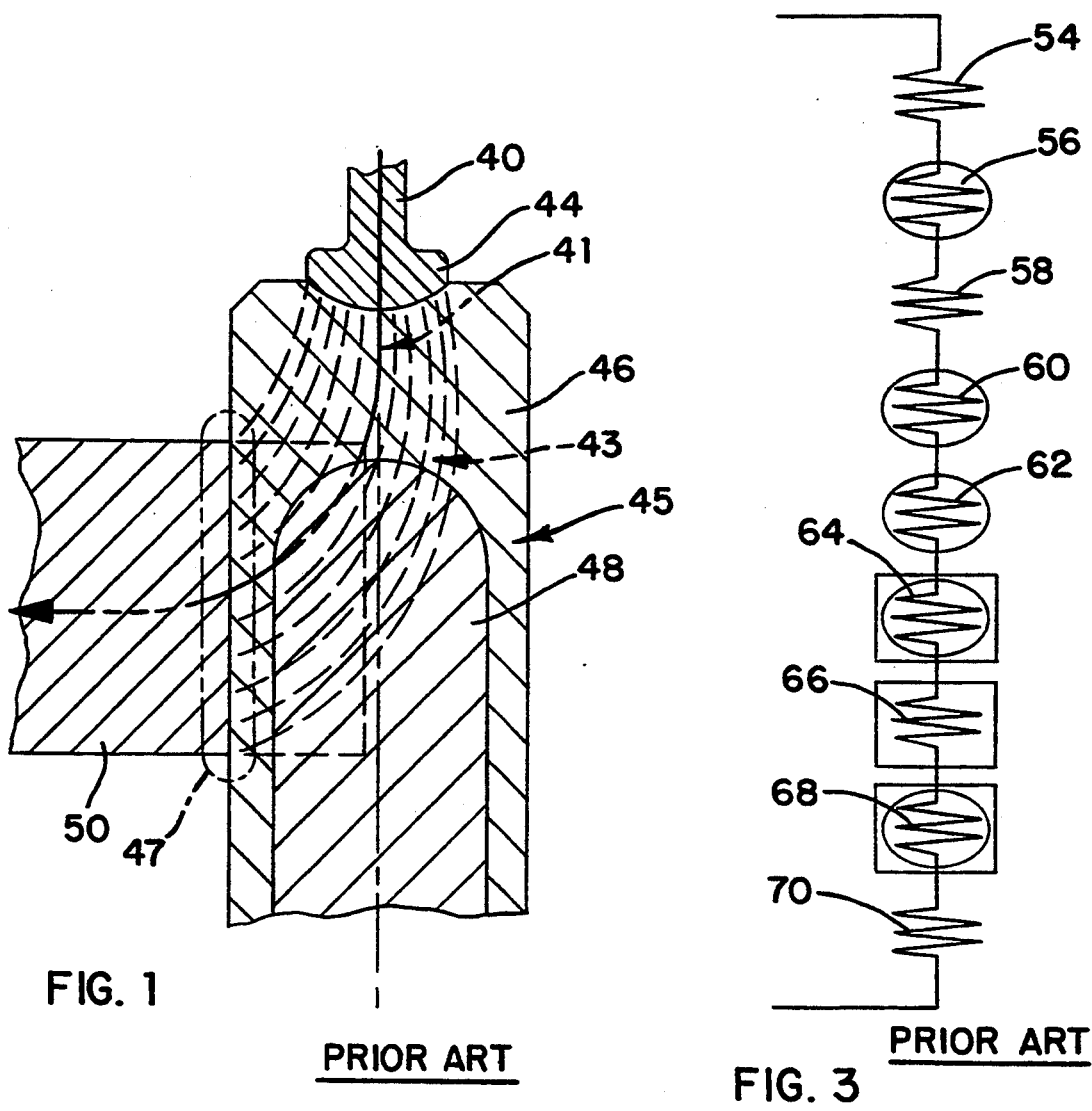
FIG. 1   PRIOR ART
FIG. 3   PRIOR ART

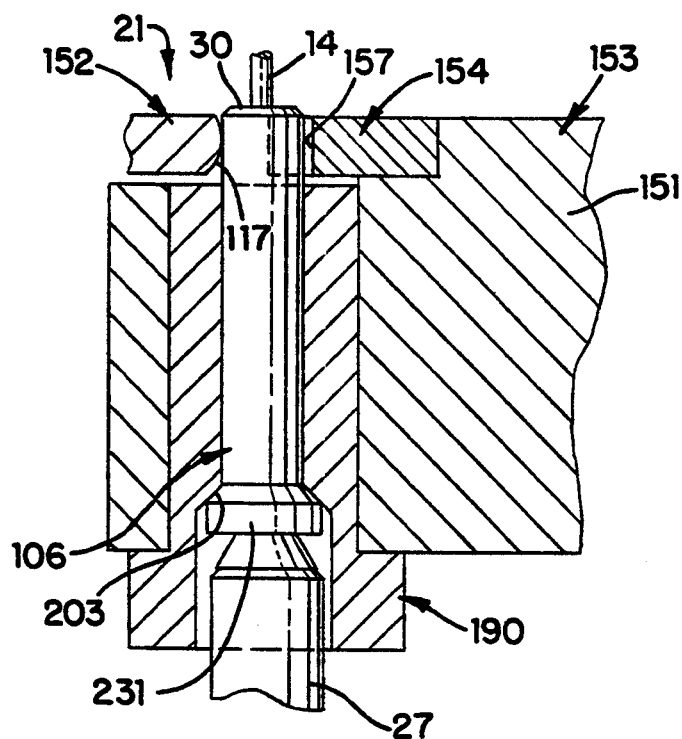
FIG. 13
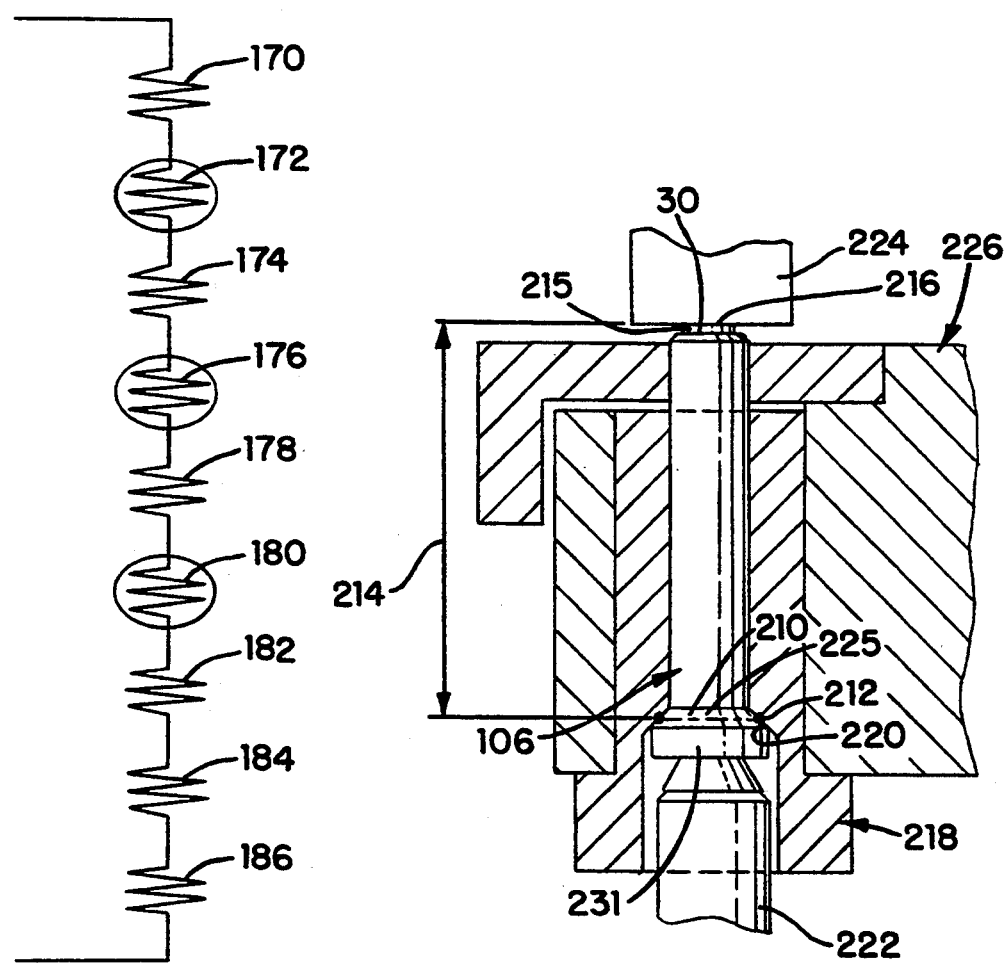
FIG. 14
FIG. 15

SPARK PLUG ELECTRODE WELDING SYSTEM

This application is a continuation-in-part of pending U.S. patent application Ser. No. 07/782,239 filed Oct. 23, 1991 now U.S. Pat. No. 5,250,778 assigned to the assignee of this invention and having a disclosure that is incorporated herein by reference.

This invention relates to an apparatus and method for welding noble metal tips to spark plug electrodes.

BACKGROUND OF THE INVENTION

Spark plugs that have electrodes that are provided with tips or pads formed of noble metal, such as platinum, are well known to those skilled in the art. A known method for forming pads of platinum material on a spark plug electrode utilizes a contact welding method in which a platinum wire is engaged with the surface of the spark plug electrode and a weld current is passed through the platinum wire causing the portion of the wire that engages the electrode to be welded to the electrode. The wire is then cut off so that a pad or tip of material remains that is welded to the electrode.

In a known system for implementing the welding of platinum wire to spark plug electrodes, a turn table is provided with several clamp assemblies. Within each clamp is provided a spark plug electrode and the spark plug electrodes are one-by-one rotated on the turntable into a welding position, the clamps are raised, an electrode is brought into contact with the raised clamp, and the welding operation is commenced.

Referring to FIG. 1, an illustration of a prior art clamp contact with the spark plug electrode and part of the weld circuit path is shown. Spark plug electrode 45 is a cylindrical electrode having an outside (reference 46) formed of a nickel based alloy, such as Inconel 600, and an internal copper core 48. According to the illustrated prior art, a large area 47 of the side of the electrode is contacted by the conductive portion 50 of the clamp so that when the wire 40 contacts the top of the electrode and current is provided therethrough along path 41, the portion of the wire 44 contacting the upper tip of the electrode melts and welds to the upper tip of electrode 45.

Lines 43 illustrate the current flowing through the electrode and show that much of the current may flow through the copper core 48. Because process variations allow for variations in the positioning of copper core 48, the weld circuit impedance varies from electrode-to-electrode, as the positioning of copper core 48 varies.

FIG. 2 shows a top view of a prior art clamping device for the electrode.

FIG. 3 illustrates a prior art weld circuit where resistance 54 represents the upper electrical lead from the weld current supply transformer. Resistance 56 represents the resistance of the platinum wire collet and its clamping around the platinum wire. Resistance 58 represents the platinum wire resistance. Resistance 60 represents the interface between the platinum being welded and the center electrode. Resistance 62 represents the resistance within the center electrode. Resistance 64 represents the resistance between the clamp and the center electrode. Resistance 66 represents the resistance within each clamp. Resistance 68 represents the resistance of the connector between the clamp and the lower electrical leads and resistance 70 represents the lower electrical leads coupled between the clamp and the weld current supply.

The resistances 56, 60, 62, 64 and 68, which are shown with surrounding circles, represent resistances that vary from cycle-to-cycle due to the nature of the process. The resistance 56, including the point of contact between the collet and platinum wire, naturally varies from cycle to cycle. This is also true of the resistance 60, representing the interface between the melting wire and the center electrode. Because the position of the copper core of the center electrode varies from electrode, to electrode, the resistance 62 of the center electrode varies from cycle to cycle. The point of clamp contact to the center electrode, represented by resistance 64, naturally varies from cycle to cycle. Because a contact must be made with each clamp in the weld station, the resistance 68 at the point of contact with the clamp and the electrical lead varies from cycle to cycle.

The resistances 64, 66 and 68, each indicated with a surrounding square, vary from clamp to clamp. In total the, Figure illustrates eight varying parameters in the above described welding system.

SUMMARY OF THE PRESENT INVENTION

Advantageously, this invention provides an improved welding apparatus and method for welding platinum tips or pads to spark plug center electrodes. Advantageously, the apparatus and method of this invention reduce cycle-to-cycle variation in the weld circuit thereby reducing process variations in the resulting center electrode units from part-to-part. Advantageously, the apparatus of this invention reduces the number of clamping devices necessary in a spark plug center electrode welding apparatus. Advantageously, the apparatus and method of this invention eliminate current flow through the copper center of the spark plug center electrode, thus eliminating the center electrode as a source of process variations.

Structurally, the apparatus of this invention comprises means for indexing a center electrode into a weld station, wherein the center electrode has a copper core, means for moving the center electrode into a clamping device, means for clamping the center electrode in place, means for providing a point electrical contact on a side of the center electrode, means for engaging a wire to a tip of the center electrode and means for passing current through the wire, electrode and point electrical contact to thereby weld the wire to the center electrode tip, wherein the point electrical contact substantially minimizes current flow through the electrode's copper core to substantially eliminate the center electrode as a source of a cycle to cycle variation.

The method of this invention comprises the steps of placing a plurality of spark plug center electrodes into a plurality of carriers so that each carrier carries one spark plug center electrode, one by one moving each carrier into a weld station, lifting the one spark plug center electrode carried in the carrier located in the weld station out of the carrier into a weld position, clamping the one spark plug center into the weld position, and welding a noble metal tip to the one spark plug center electrode.

A more detailed description of this invention is set forth further below.

BRIEF DESCRIPTION OF THE DRAWINGS

FIGS. 1 and 2 illustrate a portion of a prior art clamping apparatus used to weld a platinum wire tip to a spark plug center electrode.

FIG. 3 illustrates a prior art weld circuit and illustrates the parameters that vary from cycle-to-cycle and clamp-to-clamp in the prior art circuit.

FIG. 13 illustrates another view of the clamp according to this invention.

FIG. 14 illustrates the weld circuit of this invention and the parameters that may vary from cycle to cycle according to this invention.

FIG. 15 illustrates a coining station according to this invention.

DETAILED DESCRIPTION OF THE INVENTION

Figure 4:
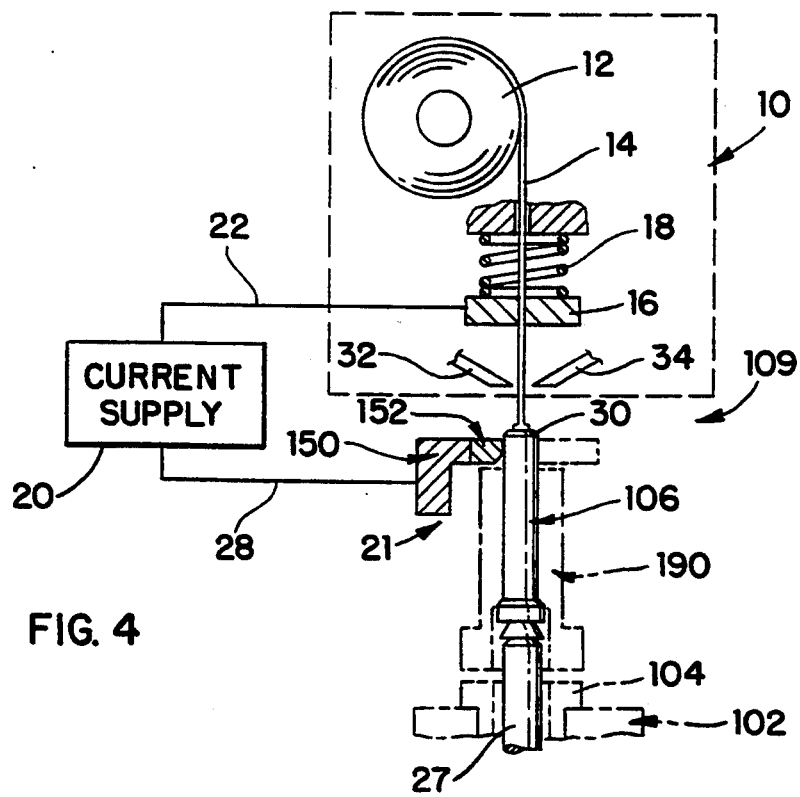
FIG. 4 is a schematic illustration of the apparatus of this invention.

Referring now to FIG. 4, according to this invention, each spark plug center electrode 106 is brought into position in the weld station by one of a plurality of carriers 102 mounted on a turntable. Each carrier 102 has a nest 104 in which the one center electrode 106 rests. A lift rod 27 is activated when the center electrode arrives in the weld station, raising the electrode 106 out of the nest 104 into nest 190 of the clamp assembly 21. Clamp assembly 21 clamps center electrode 106 in the weld position and provides electrical contact between the center electrode and weld current supply 20 via line 28 and conductive clamping portion 150.

To form a pad of platinum material that is welded to the top surface 30 of center electrode 106, the collet 16 grips the wire 14 and forces the end of wire 14 into engagement with the top surface 30 of center electrode 106. The amount of downward force applied to wire 14 against electrode 106 depends upon the amount of force developed by spring 18. Weld current is now passed through the lower portion of wire 14. The current path is from conductor 22 to collet 16 through the portion of the wire 14 between collet 16 and center electrode 106, through center electrode 106 to clamp electrode 152, through clamp 150 and then through conductor 28 to the current supply 20.

The current flowing in the path described causes the end of wire 14 that engages center electrode 106 to become molten and welded to the tip of center electrode 106. Once the weld has been made, welding current is then turned off. Collet 16 then opens and retracts and wire 14 is severed or cut off at a point closely adjacent the upper surface of center electrode 106 by cutting blades 32 and 34 that have moved toward each other to cut off the wire. Cutting blades 32 and 34 have V-shaped ends that cut the wire. The portion of the apparatus, including the supply 12 for the wire 14, the spring 18, the collet 16, the upper weld unit 10, the cutting blades 32 and 34 and current supply 20 are well known to those skilled in the art and will not be set forth in further detail herein.

At the end of the weld cycle, clamp assembly 21 releases center electrode 106, lift rod 27 lowers allowing center electrode 106 to fall back into the nest 104 of carrier 102 and carrier 102 indexes out of the weld station. As the carrier 102 indexes out of the weld station, another carrier 102 carrying another center electrode 106 to be welded is indexed into the weld station.

Figure 5:
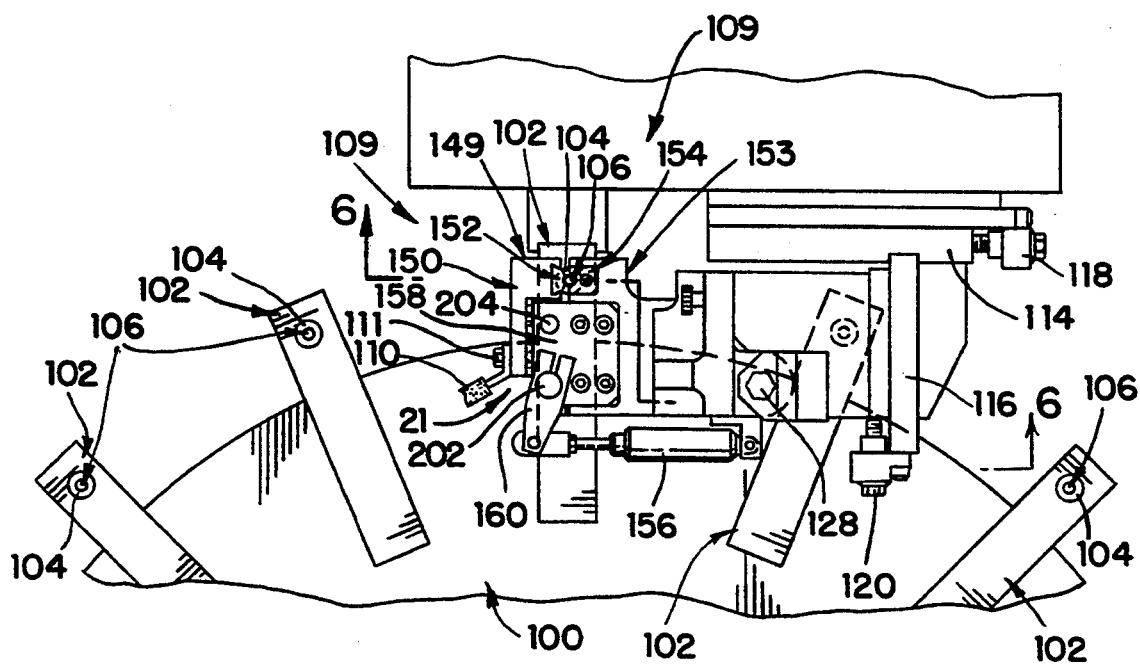
FIG. 5 is an illustration of the weld apparatus of this invention from a plan view.

Referring now to FIG. 5, a top view of the welding system according to this invention is shown. A turntable 100, of a type well known to those skilled in the art, has mounted thereon several carriers 102, preferably regularly spaced around the perimeter of the turntable 100, as shown. Each carrier 102 includes a nest 104 within which one spark plug center electrode 106 is placed for movement by carrier 102 into and out of the weld station 109.

Figure 6:
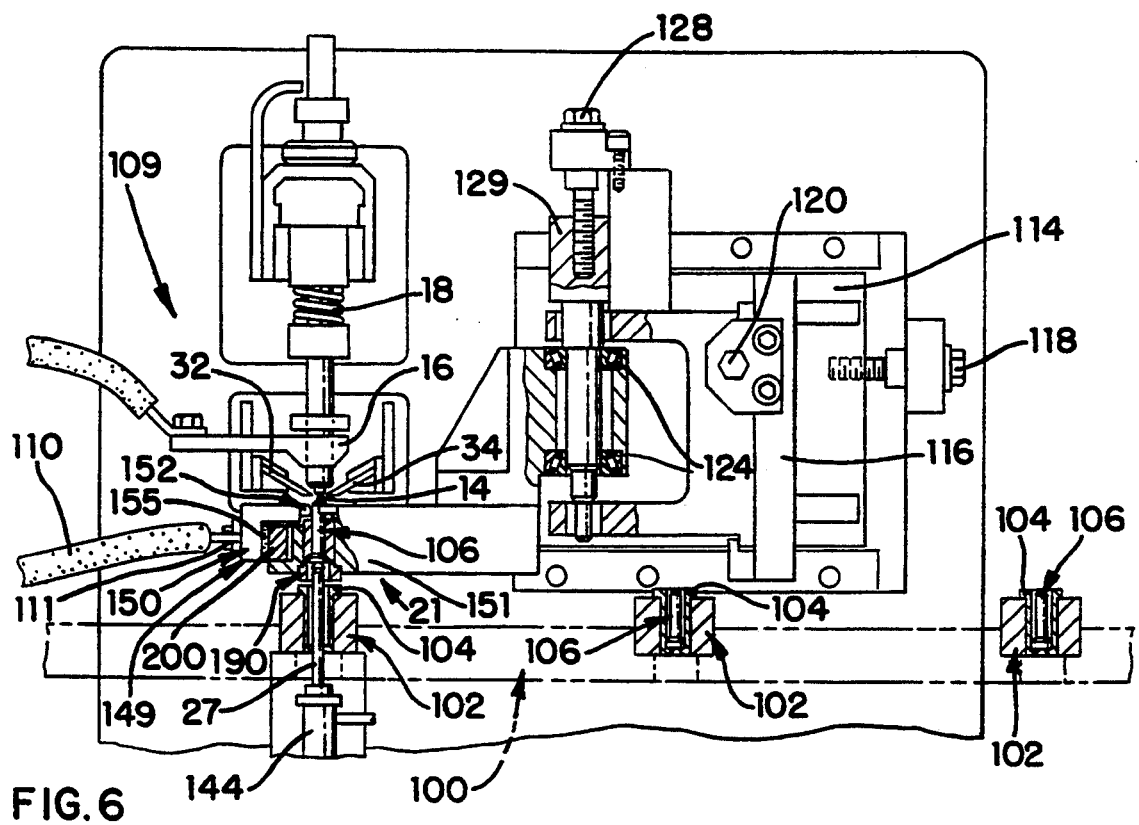
FIG. 6 is an illustration of the weld apparatus of this invention from a section view along line 6—6 as indicated in FIG. 5.
Figure 7:
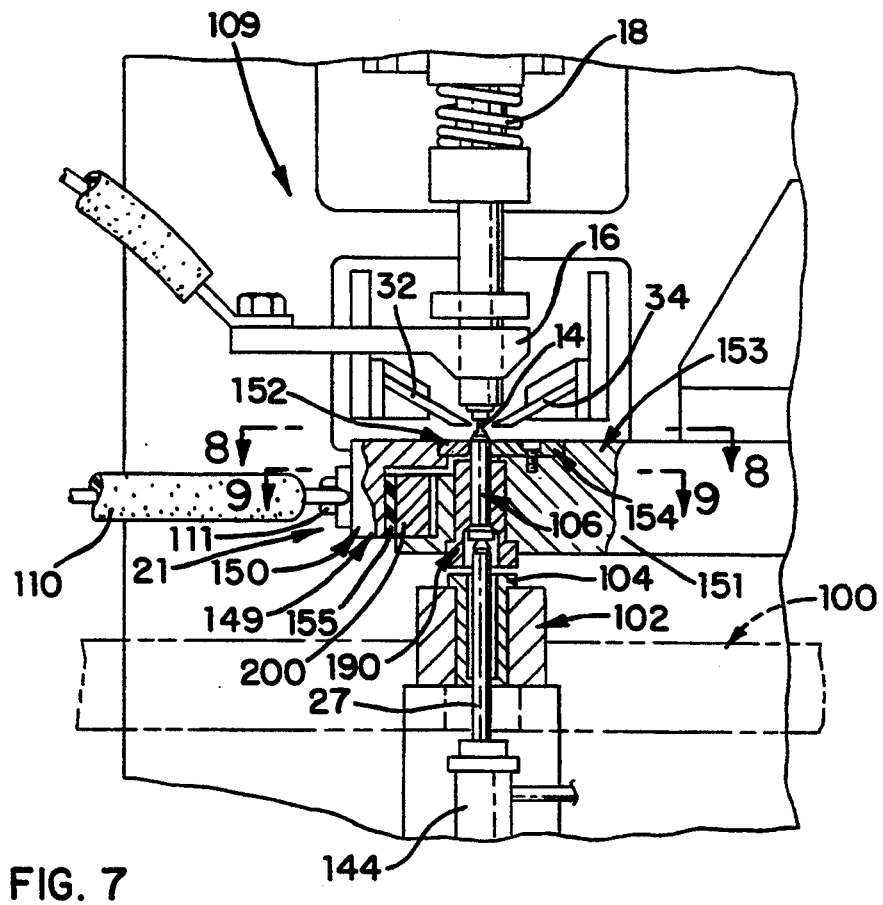
FIG. 7 is an enlarged view of a portion of FIG. 6 and illustrates the weld apparatus of this invention with a spark plug center electrode in position to be welded.

Weld station 109 includes a clamp assembly 21 for clamping center electrode 106 in place when center electrode 106 is raised into the clamping assembly by lift rod 27 (FIGS. 6 and 7). Clamping assembly 21 has a pneumatic cylinder 156 selectively controlled in a manner well known to those skilled in the art to open and close clamp assembly 21 around center electrode 106. Electrical connector 111 attaches electrical lead 110 to the conductive portion of clamp assembly 21. The clamp assembly 21 is mounted in a manner well known to those skilled in the art with keyed and sliding plates 114, 116 and 129 (FIG. 6) to allow three dimensional position adjustment via adjustment screws 118, 120 and 128.

Referring now to FIG. 6, a side view of the weld apparatus is shown. Each of the carriers 102 includes a cylindrical cavity within which each electrode 106 rests. An opening is provided at the bottom of each cavity through which lift rod 27 may pass to lift each center electrode 106 into the clamp assembly 21. Clamp assembly 21 is preferably pivotally mounted on bearings 124, in a manner well known to those skilled in the art, so that the clamp assembly may be pivoted away from the weld station 109 for maintenance, repairs, etc..

Referring now to FIG. 7, lift rod 27 is shown in a raised position lifting center electrode 106 into clamp assembly 21. A means provided, such as pneumatic cylinder 144, may be used to extend and retract lift rod 27.

Figure 8:
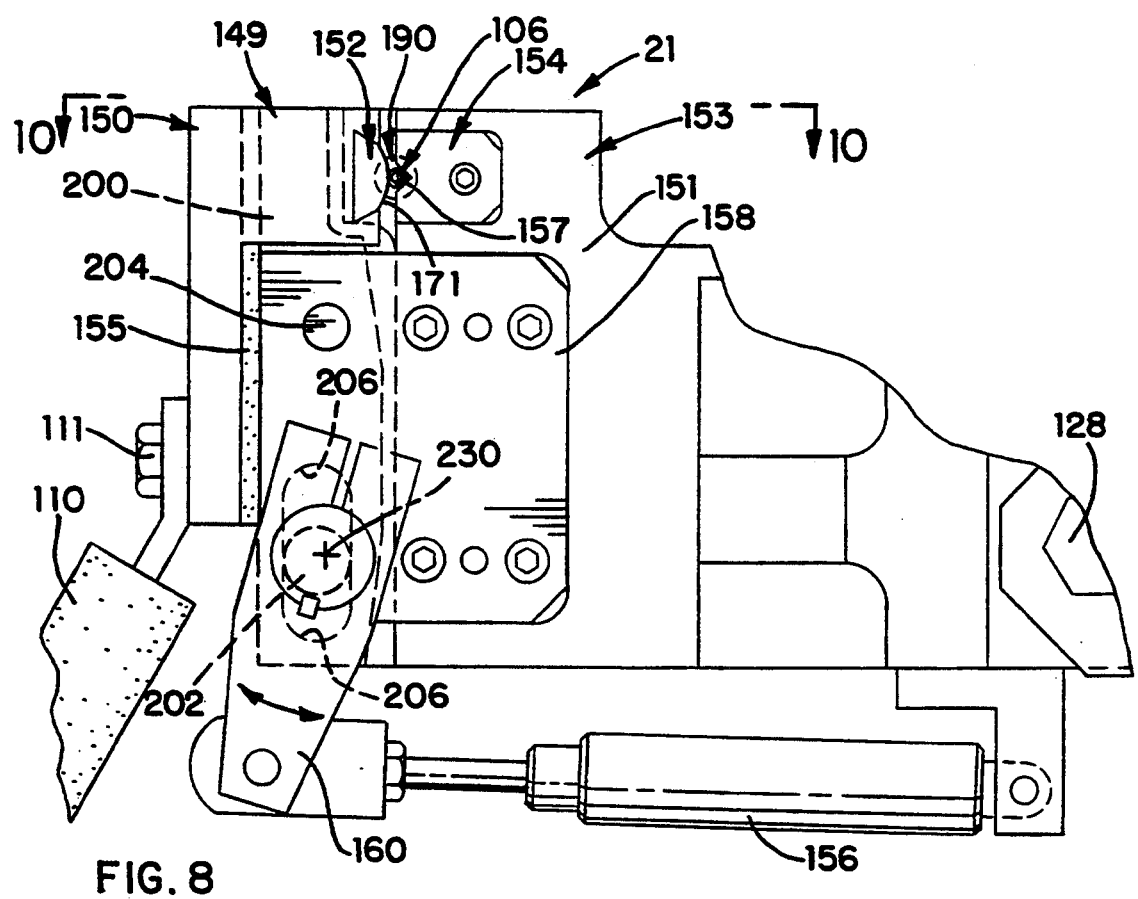
FIG. 8 illustrates an enlarged top view of the electrode clamp according to this invention as viewed from plane 8—8 in FIG. 7.
Figure 9:
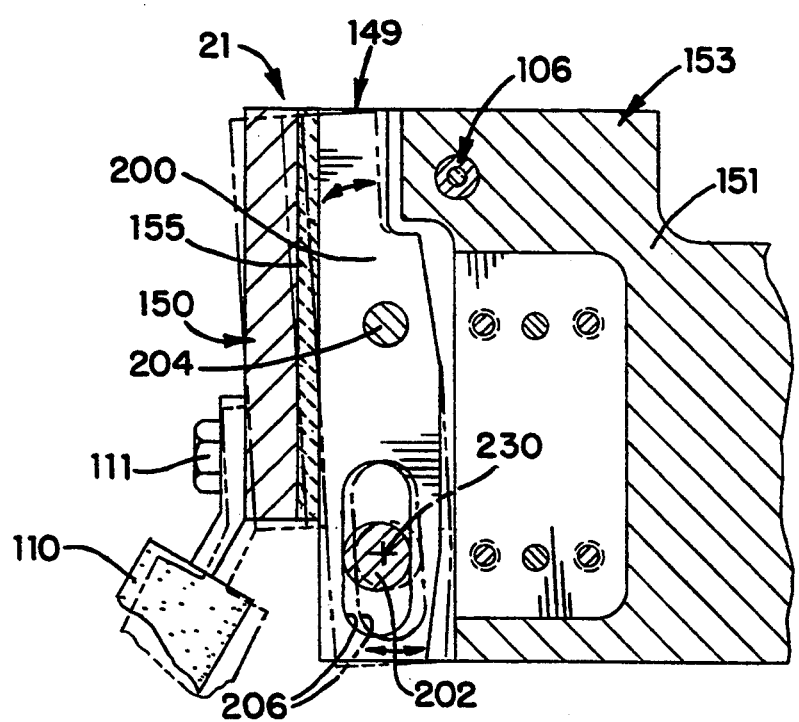
FIG. 9 illustrates a portion of the clamp according to this invention as viewed from plane 9—9 in FIG. 7.
Figure 10:
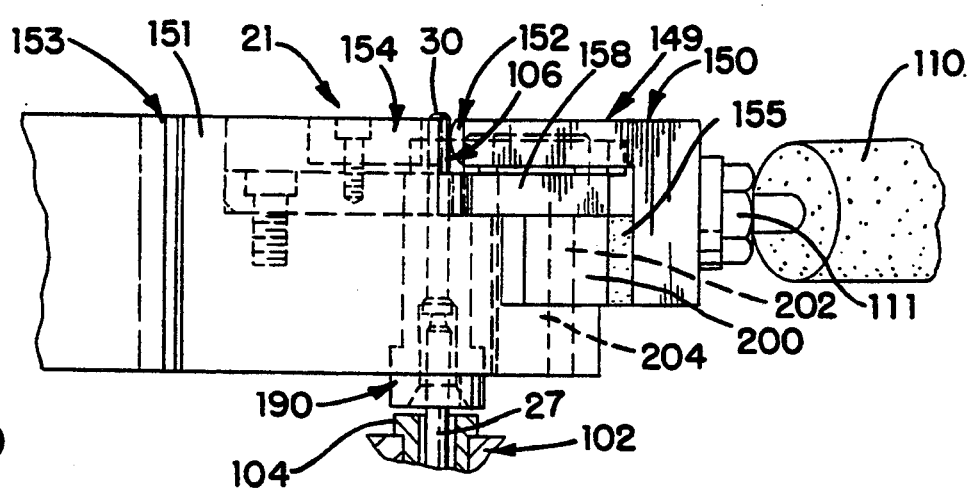
FIG. 10 illustrates another view of the clamp of FIG. 8 as seen from the other side and as indicated by line 10—10 in FIG. 8.

Referring to FIGS. 8, 9 and 10, the single clamp assembly 21 used with the improved manufacturing apparatus of this invention is shown. Clamp assembly 21 comprises a stationary body 153, pivoting member 149, clamp cam 202, pneumatic cylinder 156 and linkage 160. Stationary body 153 includes body plate 151, stationary clamp portion 154, plate 158, and receiving nest 190. Pivoting member 149 includes conductive portion 150, conductive contact 152, insulating member 155, pivot arm 200, and pivots about pivotable mount 204.

The conductive portion 150 is connected to weld current supply lead 110 as shown. The conductive portions 150 and 152 are insulated from the remainder of the clamp through insulating structural material such as micarta support 155 to insulate the remainder of clamp assembly 21 from the electrical weld current. The stationary clamp portion 154 is bolted to the body plate 151 as shown.

FIG. 9 illustrates the clamp of FIG. 8 with references 150, 152, 154, 155 and 158 removed or partially broken away. Pivot arm 200 is pivotally mounted at pivot point 204 in a conventional manner. Clamp cam 202, is fixedly attached to linkage 160. When pneumatic cylinder 156 is extended and retracted, linkage 160 pivots about pivot axis 230. Clamp cam 202 is mounted to linkage 160 off center of the pivot axis 230 of linkage 160 with respect to slot 206, causing movement of clamp cam 202, which movement has an arcuate component with respect to pivot point 204. Clamp cam 202 engages slot 206 and, when pneumatic cylinder 156 is extended and retracted, clamp cam 202 causes pivot arm 200 to pivot on pivot point 204, opening and closing the clamp.

Micarta support 155 and conductive portion 150 are affixed to pivot arm 200 in a known manner, maintaining pivot arm 200 electrically insulated from conductive portion 150. A gap (FIG. 10) is provided between conductive portion 150 and pivot arm 200 where conductive portion 150 appears to overlap pivot arm 200, to maintain conductive portion 150 isolated from pivot arm 200.

Figure 11:
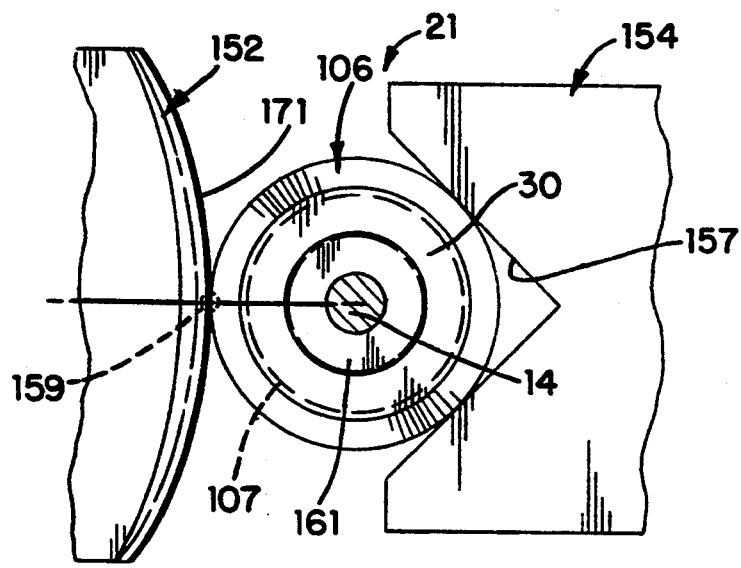
FIGS. 11 and 12 illustrate the conductive portion of the electrode clamp according to this invention.

FIG. 11 illustrates a top view of the clamp assembly 21 according to this invention. The pivoting portion of the clamp includes conductive contact 152, which has a rounded surface 171, to provide a point contact 159, in the manner according to this invention, with the center electrode 106 to be welded. Pressure between the contact point 159 and V-notch 157 of clamp portion 154 retains center electrode 106 in the clamp.

Figure 12:
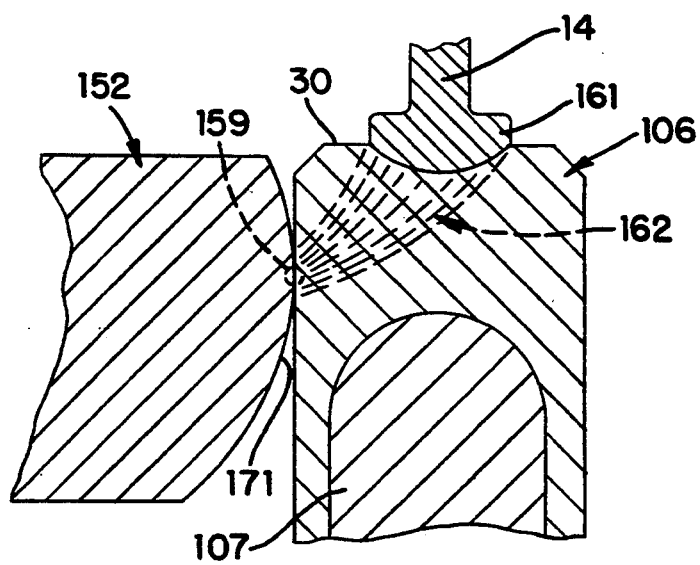

Referring to FIG. 12, the side view of the center electrode 106 and the conductive portion 152 of the clamp illustrates another view of the rounded surface 171 of conductive portion 152 and the point contact 159, positioned between the copper core 107 and the top 30 of center electrode 106. The electric current according to the process and apparatus of this invention, illustrated by lines 162, flows through platinum wire 14, including the melted and welded portion 161, through the top 30 of center electrode 106 to the point contact 159 with the conductive portion 152 of the clamp. The rounded surface 171 of conductive portion 152 is located so that, when the center electrode 106 is clamped in place, the contact point 159 is substantially near the top 30 of center electrode 106 to maintain, as a consistent process constraint, the point contact 159 above the copper zone in the center electrode.

By maintaining the point contact above the copper zone 107, the variations in copper zone location do not substantially affect the flow of current during the weld process, which is illustrated by lines 162. Using the rounded conductive contacts, as shown, positioned to be consistently above the copper center portion of the center electrode 106 regardless of the location of copper zone 107 due to process variations, the impedance of the weld circuit through the center electrode 106 remains substantially constant from electrode-to-electrode.

FIG. 13 illustrates steel receiving nest 190, attached to stationary plate 151 of the clamp. When lift rod 27 lifts the center electrode into position, the flared end 231 of the center electrode 106 rests against walls 203 of the nest 190.

FIG. 14 illustrates the weld circuit according to this invention, represented by resistances 170–186. Resistance 170 represents the resistance of the upper lead between the weld current supply and the clamp assembly. Resistance 172 represents the clamping of a platinum wire at the collet. Resistance 174 represents the resistance of the portion of the platinum wire through which current flows. Resistance 176 represents the resistance at the interface between the platinum wire and the center electrode. Resistance 178 represents the resistance of the center electrode itself. Resistance 180 represents the resistance at the point of contact between the clamp and the center electrode. Resistance 182 represents the resistance within the clamp itself. Resistance 184 represents the resistance of the clamp connection to the lower lead. Resistance 186 represents the resistance of the lower lead between the clamp contact and the weld current source.

Resistances 172, 176 and 180 are shown encircled and represent the only resistances that vary from cycle-to-cycle according to this invention. These resistances, caused by the clamping actions and the welding, naturally vary from cycle to cycle. There are no clamp-to-clamp resistance variations since only one clamp is used, which one clamp is located at the weld station.

Comparing FIG. 14 to the prior art in FIG. 3, it can be seen that this invention advantageously eliminates two cycle-to-cycle resistance variations being (1) the center electrode resistance, which variation is eliminated by ensuring that a substantial majority of the current does not pass through the copper zone in the electrode and (2) the connection to lower leads does not vary from cycle-to-cycle since there is one clamp to retain the electrodes, located at the weld station, having a permanent electrical lead connection. The clamp-to-clamp variations that were present in the prior art, FIG. 3, are eliminated according to this invention by use of carriers to move the center electrodes into and out of the weld station and the use of the one clamp at the weld station instead of multiple clamps located at the perimeter of the carrier turntable.

Thus, advantageously according to this invention, the number of variable process parameters is reduced from eight in the prior art system shown in FIG. 3 to three, as illustrated in FIG. 14.

After welding the platinum tip to the spark plug electrode, it is known to "coin" the tip. Coining typically involves striking the tip with a hammer to flatten the tip. According to this invention, after the spark plug electrode receives the platinum tip, the spark plug electrode is moved into an coining station and raised into a nest of the type shown in FIG. 15.

Referring to FIG. 15, the nest 226 has a receptacle portion 218 for receiving spark plug electrode 106, which is lifted in place by push rod 222, similar to push rod 27 in FIG. 7. Flared end 231 of the spark plug electrode 106 has surface 210 on the conical flair 225. A point 212 where surface 210 meets walls 220 of receptacle portion 218 is designated as the reference point for locating the spark plug electrode.

Hammer 224 of a type well known to those skilled in the art extends to a predetermined position, which according to this invention, is set with reference to reference point 212. In this manner, the position of surface 216 is determined directly from the reference point 212 by setting the extended position of hammer 224 with reference to the point in receptacle 218 corresponding to reference point 212. Thus there is no stack up of tolerances between the locating point 212 and the hammered position of surface 216 of electrode 215.

This compares to a prior art system in which each spark plug center electrode is located in a clamp before a tip is welded, in which location step the end of the electrode 215 is used to locate the electrode. In that system, there is a tolerance stack up of the distance between surface 30 and reference point 212 and the distance 214 between point 212 and surface 216.

Thus, the method according to this invention in view of FIG. 15 includes, after the welding step, lowering the one spark plug center electrode into the carrier located in the weld station, indexing the carrier located in the weld station to a coining station, lifting the spark plug center electrode out of the carrier in the coining station into a receptacle 218, locating the spark plug center electrode in the receptacle by a reference surface 210 on the spark plug center electrode, and coining the spark plug center electrode with a hammer 224 having an extended position set with reference to the reference surface 210.

Various improvements and modifications to this invention may occur to those skilled in the art and said improvements and modifications will fall within the scope of this invention as set forth below.

The embodiments of the invention in which an exclusive property or privilege is claimed are defined as follows:

1. A method of welding a platinum tip to a spark plug center electrode comprising the steps of:
    placing a plurality of electrodes into a plurality of carriers on a turntable, wherein one electrode is placed in each carrier;
    one by one, moving each electrode into a weld station;
    lifting the center electrode at the weld station into a weld position;
    clamping the lifted center electrode into the weld position with a clamp having a point contact with the center electrode, said point contact located between a copper zone and a top of the center electrode;
    contacting a platinum wire to the top of the center electrode; and
    welding a platinum tip to the top of the center electrode by passing a weld current through the wire and center electrode, thereby melting and welding a portion of the platinum wire to the center electrode to form the platinum tip.

2. The method of claim 1 also including the step of unclamping the electrode, lowering the electrode back into the nest and moving the next electrode into the weld station.

3. An apparatus comprising:
    a turntable system having a perimeter upon which is mounted a plurality of carriers;
    each of said plurality of carriers including a nest for retaining one spark plug center electrode per nest;
    means for successively positioning each carrier and retained spark plug center electrode into a weld station;
    means for lifting the spark plug center electrode retained in the carrier that is located in the weld station into a welding position;
    means for clamping the electrode into the welding position, said clamping means fixedly mounted at the weld station; and
    means for welding a noble metal tip to the electrode.

4. An apparatus comprising:
    a welding apparatus including means for indexing a center electrode into a weld station, wherein the center electrode comprises a copper core;
    means for moving the center electrode into a clamping device located at the weld station;
    the clamping device clamping the center electrode in a weld position;
    means for providing a point electrical contact on a side of the center electrode,
    means for contacting a wire to a tip of the center electrode; and
    means for passing current through the wire, electrode and point electrical contact to thereby weld the wire to the center electrode tip, wherein the point contact substantially minimizes current flow through the copper core of the center electrode.

5. A method of welding a noble metal tip to a spark plug center electrode comprising the steps of:
    placing a plurality of spark plug center electrodes into a plurality of carriers so that each carrier carries one spark plug center electrode;
    one by one, moving each carrier into a weld station;
    lifting the one spark plug center electrode carried in the carrier located in the weld station out of the carrier into a weld position;
    clamping the one spark plug center electrode into the weld position with a single clamp located in the weld station; and
    welding the noble metal tip to the one spark plug center electrode, wherein the single clamp eliminates clamp-to-clamp process variations.

6. The method of claim 5, also comprising the steps of:
    after the welding step, lowering the one spark plug center electrode into the carrier located in the weld station;
    indexing the carrier located in the weld station to a coining station;
    lifting the spark plug center electrode out of the carrier in the coining station into a receptacle;
    locating the spark plug center electrode in the receptacle by a reference surface on the spark plug center electrode; and
    coining the spark plug center electrode with a hammer having an extended position set with reference to the reference surface.

* * * * *